C. M. LUNGREN.

REGENERATIVE GAS LAMP.

No. 10,793. Reissued Jan. 4, 1887.

WITNESSES:

Gabriel J. W. Galster.

Wm. H. Capel

INVENTOR

Chas. M. Lungren.

BY

Townsend & Mac Pherson

ATTORNEY

N. PETERS, Photo-Lithographer, Washington, D. C.

UNITED STATES PATENT OFFICE.

CHARLES M. LUNGREN, OF NEW YORK, N. Y.

REGENERATIVE GAS-LAMP.

SPECIFICATION forming part of Reissued Letters Patent No. 10,793, dated January 4, 1887.

Original No. 347,622, dated August 17, 1886. Application for reissue filed October 18, 1886. Serial No. 216,573.

*To all whom it may concern:*

Be it known that I, CHARLES M. LUNGREN, a citizen of the United States, and a resident of New York, in the county of New York and State of New York, have invented a certain new and useful Regenerative Gas-Lamp, of which the following is a specification.

The object of this invention is to provide an improved construction of regenerative gas-lamps of the type in which the air to supply the interior of the flame is introduced into it through passages leading across the escape-flue. The great difficulty experienced with lamps of this form has been the clogging up of the gas-burner portion of the apparatus by overheating. In the present lamp I remedy this defect by placing the gas-burner below the flame and arrange air-passages around and through it in such relation to the external air that the gas burner and tip are bathed by currents of comparatively cool air. The highly-heated air conveyed through the passages crossing the escape-flue and the air-heating chamber within the flame does not come in contact with the burner or tip, but is thrown upon the flame at a point above the tip.

Figure 1:
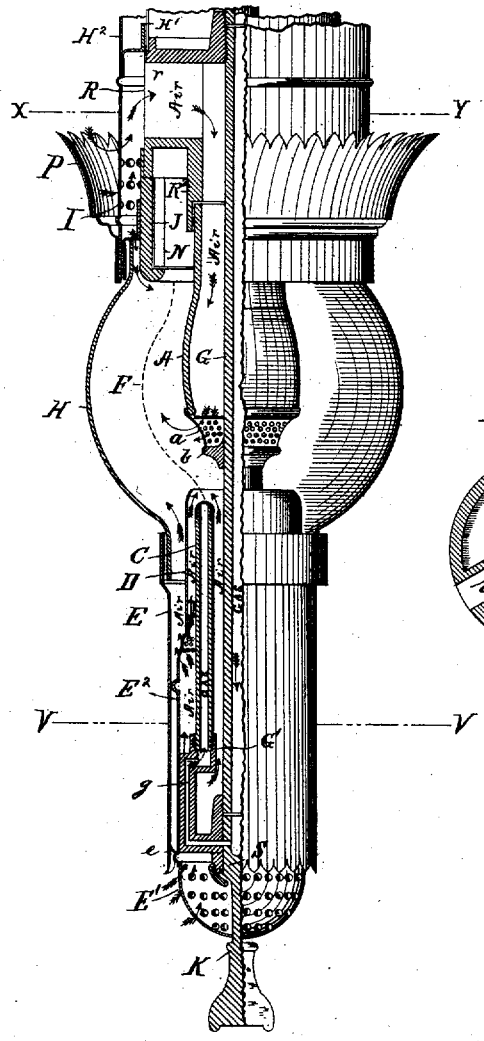
Figure 4:
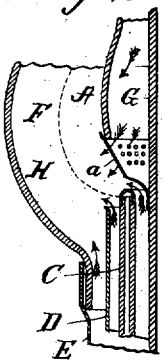
Figure 2:
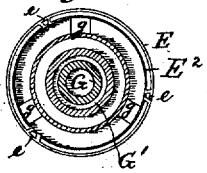

In the drawings, Figure 1 shows a lamp, partly in elevation and partly in vertical section, embodying my improved construction. Fig. 2 shows a plan of the gas-burner below the line V V, and Fig. 3 a cross-section on the line X Y of the air cross-tubes. Fig. 4 shows a modification of certain details.

In Fig. 1 C is an annular gas-burner, shown as consisting of two concentric cylinders fitting in the ring G′, which is attached to the central gas-supply pipe by three arms, *g*. This part of the lamp may be constructed of a ring of tubes, if desired, and the gas may burn from perforations or a slit located either on the top of the burner, as shown in Fig. 1, or around its periphery at its upper end, as shown in Fig. 4.

In suspended lamps it is preferable, on account of compactness and cheapness of construction, to carry the gas-supply pipe G up through the center of the burner and escape-flue; but this pipe may enter the burner at or near its lower end at the sides or directly from below. When a center suspension-pipe is used, the stop-cock S may be placed in the position shown. The burner is preferably surrounded by an air-casing, D, to deflect air upon the flame on its under side, at the root, and insure the cooling of the tip. This casing may be supported by the shell $E^2$, which is perforated at its upper end to admit a further amount of air upon the lower side of the flame. Above the burner-tip there is arranged a circular deflector, *b*, which serves to divide and direct the currents of air passing up through the center of the burner and passing down through the air-heating chamber A. This deflector need not be a separate piece, but may be formed by the lower surface of the perforated metal piece *a*, as shown in Fig. 4. The air to supply the interior of the flame is admitted through passages *r*, which are arranged across the escape-flue. From these passages it passes downward into a chamber, A, located within the flame, from the lower end of which it issues upon the flame, preferably through a number of fine apertures, such as are provided by a suitably-shaped piece, *a*, of perforated metal.

Figure 3:
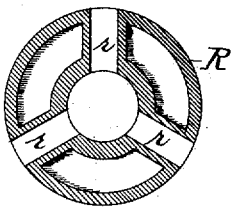

The cross air-passages and the outer and inner walls of the escape-flue are preferably cast in one piece, and the whole structure may be designated, to distinguish it from the air-chamber A, the "regenerator." This is shown in vertical section at R in Fig. 1 and in cross-section in Fig. 3. A downward cylindrical extension, $R^2$, serves to continue the air-channel down to the air-chamber A. This latter, being within the flame, is preferably constructed of a material having a white reflecting-surface—such as porcelain—though it may be made of metal provided with a whitened surface. The flame is inclosed in a glass globe, H, which may rest, as shown, upon a cylindrical casing, E, which in turn rests upon the casing $E^2$ by means of three offsets, *e*, which are turned inwardly, as shown in Fig. 3, the bead upon the lower end of $E^2$ being cut away in three points, (not shown,) to allow E to be removed for taking off the glass.

To protect the glass from the heat of the flame, the opening of the escape-flue is arranged some distance inward from the edge of the globe, and a current of air is allowed to enter between the neck of the globe and the wall J of the escape-flue, which serves to keep the globe-neck cool and to aid in sweeping the tips of the flame inward away from the glass and into the escape-flue. A casing, I, surrounding the regenerator, serves to protect the ends of the cross-passages *r* from drafts.

H′ is the chimney; $H^2$, a sheathing, which may be of ornamental design; and P, an ornamental crown.

In my application No. 192,632, filed February 20, 1886, are exhibited some of the elements shown and described in this application. My present claims are therefore limited to the constructions and organizations of devices set forth at the end of this specification.

What I claim as my invention is—

1. The combination of an annular burner having an air-passage through it, which passage communicates with the external air at its lower end, an air-heating chamber located above the burner-tip, and having an outlet for air at its lower end and an inlet for air at its upper end, an air passage or channel leading across the escape-flue and communicating with the upper end of the air-heating chamber, an inclosing-globe, an escape-flue the inlet end of which surrounds the upper part of the air-heating-chamber, and an air-passage between the wall of the escape-flue and globe, substantially as specified.

2. The combination of an annular burner having an air-passage through it, which passage communicates with the external air at its lower end, a deflector arranged above the burner-tip, an air-heating chamber located above the deflector and having an outlet for air at its lower end and an inlet for air at its upper end, an air passage or channel leading across the escape-flue and communicating with the upper end of the air-heating chamber, an inclosing-globe, an escape-flue the inlet end of which surrounds the upper part of the air-heating chamber, and an air-passage between the wall of the escape-flue and globe, substantially as specified.

3. The combination of an annular burner having an air-passage through it and an air-casing around it, both of these passages communicating with the external air at their lower ends, an air-heating chamber located above the burner-tip and having an outlet for air at its lower end and an inlet for air at its upper end, an air passage or channel leading across the escape-flue and communicating with the upper end of the air-heating chamber, an inclosing-globe, an escape-flue the inlet end of which surrounds the upper part of the air-heating chamber, and an air-passage between the wall of the escape-flue and the globe, substantially as specified.

4. The combination of an annular burner having an air-passage through it, which passage communicates with the external air at its lower end, a central gas-suspension pipe, an air-heating chamber surrounding the central gas-pipe and located above the burner-tip, said chamber having an outlet for air at its lower end and an inlet for air at its upper end, an air passage or channel leading across the escape-flue and communicating with the upper end of the air-heating chamber, an inclosing-globe, an escape-flue the inlet end of which surrounds the upper part of the air-heating chamber, and an air-passage between the wall of the escape-flue and the globe, substantially as specified.

5. The combination of a burner having an air-passage through it conveying air upwardly to the interior of the flame, an air-passage leading across the line of the escaping products of combustion and conveying air downwardly to the interior of the flame, an escape-flue, an inclosing-globe, and an air-passage leading to an opening into the globe at or near its top, substantially as specified.

6. The combination of a burner having an air-passage through it conveying air upwardly to the interior of the flame, an air-passage leading across the line of the escaping products of combustion and conveying air downwardly to the interior of the flame, a deflector located above the burner-tip, an escape-flue, an inclosing-globe, and an air-passage leading to and opening into the globe at or near its top, substantially as specified.

7. The combination of a burner having an air-passage through it conveying air upwardly to the interior of the flame, an air-passage leading across the line of the escaping products of combustion and conveying air downwardly to the interior of the flame, an air-passage surrounding the burner, conveying air upwardly to the outside of the flame, an escape-flue, an inclosing-globe, and an air-passage leading to and opening into the globe at or near its top, substantially as specified.

8. The combination of a burner having an air-passage through it conveying air upwardly to the interior of the flame, an air-passage leading across the line of the escaping products of combustion and conveying air downwardly to the flame, an air-passage surrounding the burner, conveying air upwardly to the outside of the flame, a deflector located above the burner-tip, an escape-flue, an inclosing-globe, and an air-passage leading to and opening into the globe at or near its top, substantially as specified.

CHARLES M. LUNGREN.

Witnesses:
WM. H. CAPEL,
E. J. GRISWOLD.